United States Patent [19]

Edwards et al.

[11] Patent Number: 4,955,996
[45] Date of Patent: Sep. 11, 1990

[54] TOP LOADING DUST COLLECTOR

[75] Inventors: Robert R. Edwards, Fort Mill, S.C.; William J. Klimczak, Pineville, N.C.

[73] Assignee: Dustex Corporation, Charlotte, N.C.

[21] Appl. No.: 355,772

[22] Filed: May 23, 1989

[51] Int. Cl.$^5$ ............................................. B01D 46/04
[52] U.S. Cl. ......................................... 55/302; 55/498;
   55/493; 55/502; 55/508; 55/521
[58] Field of Search ................. 55/302, 376, 378, 493,
   55/497, 498, 502, 508, 521, 499; 210/493.1,
   493.2

[56] References Cited

U.S. PATENT DOCUMENTS

| | | |
|---|---|---|
| 2,255,519 | 9/1941 | Preston . |
| 3,505,794 | 4/1970 | Nutter et al. ...................... 55/502 X |
| 4,097,255 | 6/1978 | Samolis ............................... 55/302 X |
| 4,222,755 | 9/1980 | Grotto ............................... 55/502 X |
| 4,278,454 | 7/1981 | Nemesi . |
| 4,322,230 | 3/1982 | Schoen et al. ..................... 55/502 X |
| 4,452,616 | 6/1984 | Gillingham et al. . |
| 4,504,288 | 3/1985 | Kreft ..................................... 55/302 |
| 4,765,811 | 8/1988 | Beckon ................................. 55/498 |
| 4,838,903 | 6/1989 | Thomaides et al. .............. 55/498 X |

FOREIGN PATENT DOCUMENTS 2421846 11/1975 Fed. Rep. of Germany .
2806549  8/1979 Fed. Rep. of Germany .

Primary Examiner—Charles Hart
Attorney, Agent, or Firm—Bell, Seltzer, Park & Gibson

[57] ABSTRACT

This invention relates to self cleaning dust collectors having top mounted filter cartridges. The top mounted filter cartridges include a top mounting plate having an annular flange and an outer peripheral lip to support and carry a sealing gasket. The outer peripheral lip provides lateral support for the gasket under the pressures involved during the operation of the dust collector, and it also serves to prevent over compression of the gasket. The dust collector is further provided with a reverse pulse air cleaning system which includes an air delivery pipe located above the filter cartridges, and with the air delivery pipe being spaced from the dividing wall a sufficient distance to allow for upward removal and easy replacement of the filter cartridges without extensive assembly and disassembly of the dust collector.

10 Claims, 2 Drawing Sheets

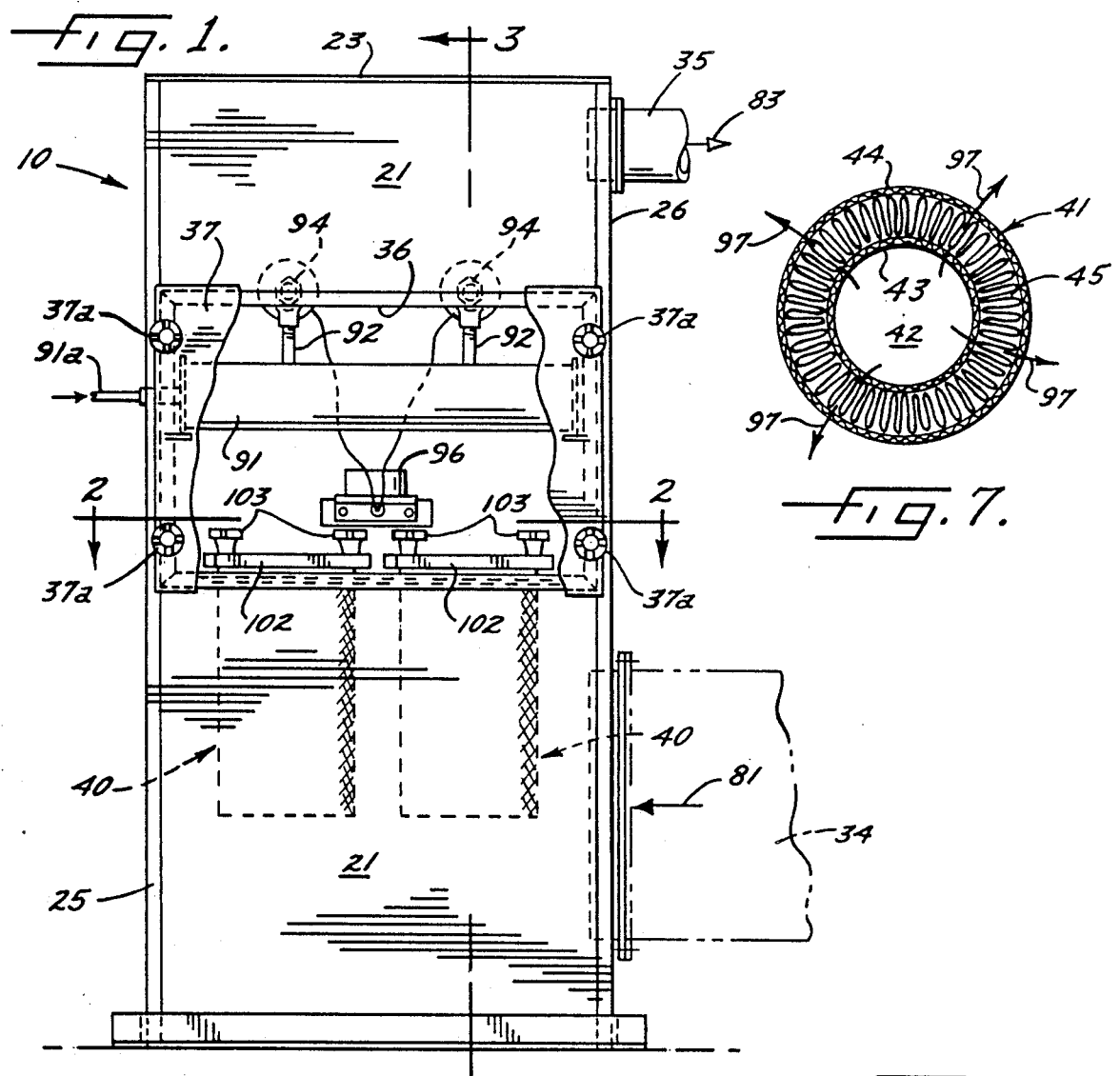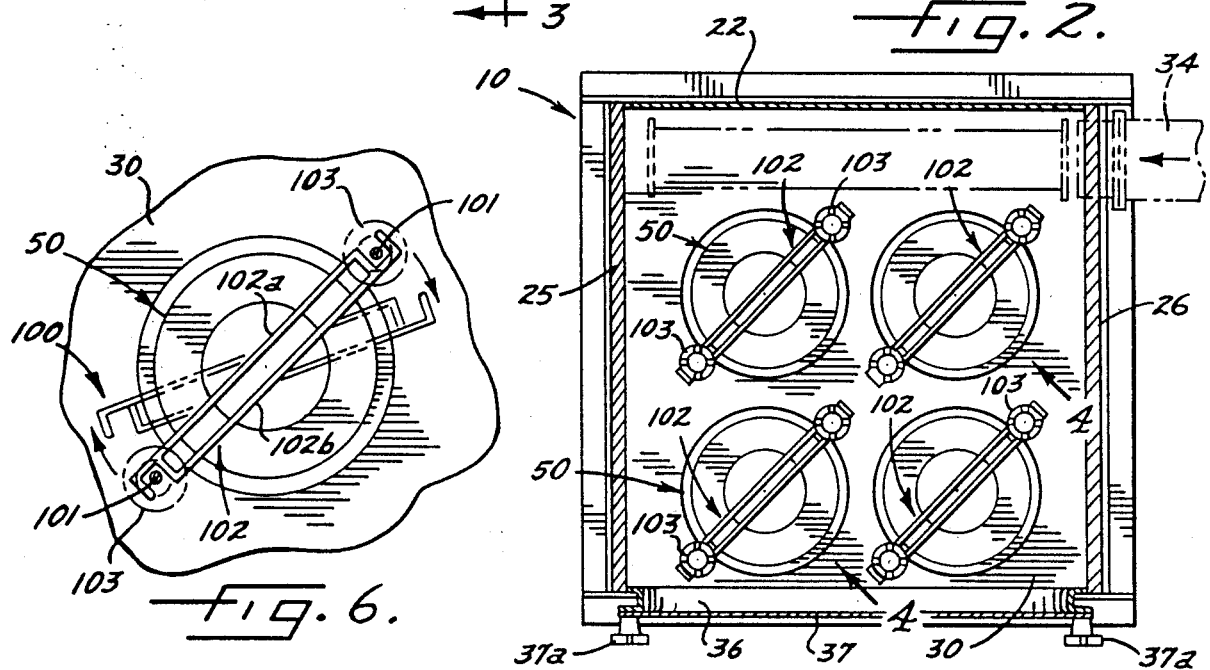

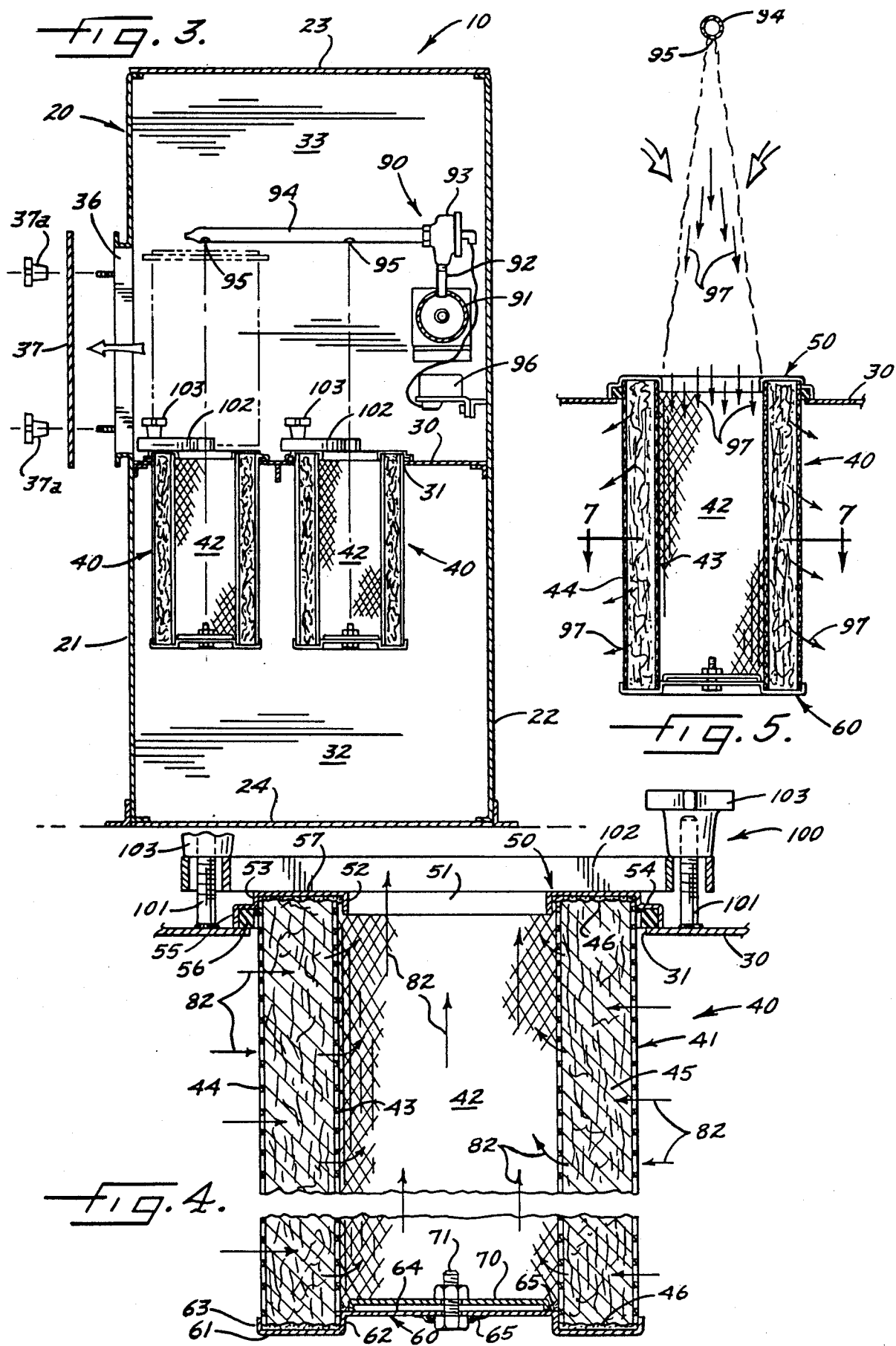

TOP LOADING DUST COLLECTOR

FIELD OF THE INVENTION

This invention relates to dust collectors and more particularly to self cleaning cartridge type dust collectors.

BACKGROUND OF THE INVENTION

In a typical dust collector, a series of filters are supported by a dividing wall to separate particulate materials from a flow of air. At times when dust has accumulated on the filters and restricts the air flow, a reverse air pulse is directed through the filters in a direction opposite to the primary air flow to dislodge accumulated dust from the filters. The pressures and flow rates in both directions can produce substantial forces on the filters. Accordingly, there are times when the filters must be replaced. Unfortunately many prior art designs do not provide sufficient access to the filters to permit easy replacement. Such forces also exert substantial stresses on the mounting for the filters to the dividing wall and to the gaskets or seals between the filters and the dividing wall.

U.S. Pat. No. 4,452,616 to Gillingham et al. discloses a self-cleaning air filter with filter elements supported from the inlet side of the dividing wall. Each filter element includes a gasket at the end wall thereof to engage the dividing wall in an air tight manner when the filter element is forced against the wall by a cam at the opposite end of the filter element. In this arrangement, however, the filter elements are not readily accessible. More particularly, if a filter most remote from the access panel were in need of replacement, many filters between the access panel and the malfunctioning filter would have to be removed to allow the filter to be replaced.

U.S. Pat. No. 4,278,454 to Nemesi discloses a cartridge filter apparatus wherein the cartridge is secured to the underside of the dividing wall by a threaded connector rod. The connector rod is suspended from the top side of the dividing wall by an inductor unit. The arrangement is provided with a gasket at the peripheral edge of the inductor unit. However, the gasket must support the entire weight of the cartridge and the inductor unit during operation of the dust collector which includes the pressures of a main air flow and a reverse air flow. The gasket must therefore flex to maintain the seal without being over compressed and damaged. Further, this arrangement provides a tedious and frustrating process of replacing the filter cartridge, since the rod extends the length of the cartridge and has to be passed through the end plate of the filter cartridge. The filter cartridge then has to be supported up against the dividing wall while a knob is threaded onto the rod. Depending on the size and weight of the filter cartridge this can be a difficult task.

Accordingly, it is an object of the present invention to provide a dust collector which avoids the drawbacks of the prior art as discussed above.

It is more a particular object of the invention to provide a dust collector with secure mounting of the filter cartridges and quick and easy replacement of the filter cartridges.

It is a further object of the present invention to provide a dust collector with secure mounting of the filter cartridge with a reliable and effective seal.

SUMMARY OF THE INVENTION

Accordingly, the above and other objects and advantages of the present invention are achieved in the embodiment illustrated herein by the provision of an apparatus for separating particulate matter from an air flow comprising a housing having a hollow interior space. A dividing wall separates said hollow interior space into a first inlet chamber and a second outlet chamber. The dividing wall further includes at least one generally circular opening for the air flow to pass through from the inlet chamber to the outlet chamber. Inlet means are provided in communication with the inlet chamber for directing the air flow into the housing, and outlet means are provided in communication with the outlet chamber for exhausting the air flow from the housing. The apparatus further comprises a filter cartridge mounted in the opening of the dividing wall for separating particulate matter from the gas flow passing through the opening. The filter cartridge is generally elongate and includes a mounting plate at one end thereof. The mounting plate has a central opening to permit passage of air therethrough, and it is radially larger than the opening in the dividing wall and is positioned in close proximity with the dividing wall. The mounting plate further includes a peripheral lip extending longitudinally with respect to the filter cartridge from the outer periphery of the mounting plate in the direction of the opposite end of the filter cartridge. Sealing means is positioned between the mounting plate and the dividing wall for surrounding the opening and sealing the interface between the mounting plate and the dividing wall substantially airtight. The apparatus further includes clamping means for releasably supporting the filter cartridge in the opening of the dividing wall so as to compress the sealing means between the mounting cap and the dividing wall.

In the preferred embodiment, the filter cartridge comprises a filter element of hollow cylindrical configuration having an internal passageway extending between its opposite ends, and with a bottom end plate closing the internal passageway. Also, the apparatus preferably includes a reverse air pulse means for periodically directing a reverse air flow pulse downwardly through the central opening of the mounting plate and into the internal passageway, so as to remove accumulated particulate matter from the exterior surface of the filter element. The reverse air pulse means includes an air delivery pipe positioned above the dividing wall a distance sufficient to permit the filter cartridge to be withdrawn upwardly from the opening in the dividing wall and removed through a door in the housing.

BRIEF DESCRIPTION OF THE DRAWINGS

Some of the objects of the invention have been stated and others will become apparent as the description of the invention proceeds when taken in conjunction with the accompanying drawings in which—

FIG. 1 is a partly sectioned front elevation view of a dust collector embodying the features of the present invention;

FIG. 2 is a horizontal cross sectional view taken along line 2—2 in FIG. 1;

FIG. 3 is a vertical cross sectional view of the dust collector taken along line 3—3 in FIG. 1;

FIG. 4 is an enlarged fragmentary vertical cross sectional view taken along line 4—4 in FIG. 2;

FIG. 5 is an enlarged fragmentary cross sectional view illustrating the spacing of the air pulse directing means with the filter cartridge;

FIG. 6 is an enlarged fragmentary top view of the filter cartridge in the dust collector and illustrating the connection of the clamping means for securing the filter cartridge; and FIG. 7 is a top cross sectional view of the filter cartridge taken along line 7—7 in FIG. 5;

DETAILED DESCRIPTION OF THE PREFERRED EMBODIMENT

Referring to the drawings, FIGS. 1, 2 and 3 illustrate a preferred embodiment of a dust collector in accordance with the present invention, and which is generally indicated by numeral 10. The dust collector 10 is arranged to receive a flow of air or other gas to separate particulate matter therefrom and exhaust clean or cleaner air therefrom. The dust collector 10 generally comprises a housing 20 (FIG. 3) with a hollow interior space. The housing 20 may have many various shapes and sizes, however in the illustrated embodiment it is a rectangular cabinet like structure including a front wall 21, a back wall 22, a top wall 23, a bottom wall 24, a left sidewall 25, and a right sidewall 26 secured together along mutual edges in a substantially airtight arrangement. The hollow interior space of the housing 20 is divided by a horizontal dividing wall 30 forming a first inlet chamber 32 in the lower portion thereof, and second outlet chamber 33 in the upper portion thereof. A access door 36 leads into the outlet chamber 33 to facilitate maintenance as hereinafter further described, and the door 36 is closed by a removable cover 37 by means of knobs 37a. The dividing wall 30 includes four generally circular openings 31 which are arranged in a rectangular pattern as seen in FIG. 2, to permit air from the inlet chamber 32 to pass upwardly therethrough into the outlet chamber 33. The dividing wall 30 supports a filter cartridge 40 in each of the openings 31. Each filter cartridge 40, as explained more fully below, is arranged to separate particulate matter in the air flow from the air passing through the opening 31, and it is the size and number of such cartridges that define the capacity of the dust collector. The air flow is provided by an inlet port 34 leading into the inlet chamber 32 and is carried away by an outlet port 35 leading from the outlet chamber 33.

Each filter cartridge 40, as is best illustrated in FIGS. 4 and 5, more particularly comprises a filter element 41 having an elongate hollow cylindrical configuration with an internal passageway 42. At the top end of the filter element 41 is a top mounting plate 50. At the opposite bottom end of the filter element is a bottom end plate 60. As illustrated more particularly in FIG. 7, the filter element 41 has a generally circular cross-sectional shape and has a diameter less than the diameter of opening 31 in dividing wall 30 so as to allow the filter element to be removably positioned therein. The filter element 41 further includes a generally rigid inner perforated tubular wall 43 and a coaxial outer perforated tubular wall 44. The tubular walls 43 and 44 define respective inner and outer cylindrical surfaces of the filter element and define an annular space therebetween. In the preferred embodiment, the perforated tubular walls 43 and 44 are made of expanded metal with welded overlapping edges. In the annular space between the inner and outer perforated tubular walls 43 and 44 is positioned a filter medium 45, which preferably comprises a sheet of porous filter paper which is impermeable to particulate matter but permeable to air and gases. As illustrated, the filter medium 45 is pleated in accordion fashion to provide a large surface area. At the upper and lower regions of the filter medium 45, potting compound 46 is used to prevent air leaks around the edges thereof.

The top mounting plate 50 is preferably a rigid metal structure having substantial strength and is secured to the inner and outer tubular perforated walls 43 and 44 such as by welding or other known means. The top mounting plate 50 is generally circular having a diameter greater than the diameter of the opening 31 in dividing wall 30. A central opening 51 is provided in the top mounting plate 50 which is generally aligned with the internal passageway 42. The mounting plate 50 in the preferred embodiment, includes an annular portion 57 which is generally coincident with the top portion of the filter medium 45. Downwardly extending from the edges of the annular portion 57 is a longitudinally extending inner collar 52 and a longitudinally extending outer collar 53, generally overlapping with the inner and outer perforated tubular walls 43 and 44, respectively. The collars 52 and 53 provide generally longitudinally engaging surfaces by which the top mounting plate and the tubular walls 43 and 44 may be secured together.

The top mounting plate 50 further includes an annular flange 54 extending radially outwardly from the lower periphery of the collar 53 and outwardly from the wall 44 and filter element 41. A continuous peripheral lip 55 extends longitudinally from the outer periphery of the annular flange 54. In the preferred embodiment, the collars 52 and 53, the flange 54 and the lip 55 form a unitary top mounting plate which may be formed from sheet metal which has been pressed into the desired shape. The flange 54 and lip 5 serve to carry a resilient sealing gasket 56. The sealing gasket 56 surrounds or encircles the opening 31 and provides an airtight seal between the top mounting plate 50 and the dividing wall 30. The sealing gasket 56 is preferably made of rubber or other flexible material to accommodate variations in the surfaces of the dividing wall 30 and the annular flange 54 and to be compressed therebetween. The sealing gasket 56 further has an uncompressed thickness in the longitudinal direction which is at least equal to and preferably greater than the longitudinal dimension of the downwardly extending lip 55. In the preferred arrangement, as best seen in FIG. 4, the lip 55 is adapted to engage the dividing wall 30 to prevent over compression of the sealing gasket 56 and to further provide rigid support for the cartridge filter in the dust collector 10. The lip 55 also serves to provide lateral support for the sealing gasket 56 which is more fully explained below. It should also be apparent that cartridges 40 are supported by the upper side of the dividing wall 30 such that the top mounting plate 50 is positioned above the dividing wall 30 and the remainder of the filter cartridge 40 is essentially entirely below the dividing wall 30 and in the inlet chamber 32. Therefore the cartridges 40 are loaded and unloaded from the top and are thereby characterized as top loading cartridges.

At the bottom of the filter element 41 is a bottom plate 60 which closes the internal passageway 42 of a filter cartridge 40. The bottom plate 60 comprises a portion 61 which is coincident with the filter medium 41. Positioned along the inner and outer tubular walls 42 and 44 and extending from the portion 61 are an inner collar 62 and an outer collar 63 to provide longitudinal surfaces by which the bottom plate 60 may be secured to the inner and outer tubular walls 43 and 44. The end plate 60 further comprises a central portion 64 to close the lower end of the hollow internal passageway 42. To provide additional support and strength for the bottom plate 60 a supporting wall 70 is bolted to the bottom plate 60 by means of a bolt 71. To seal potential leaks, potting compound 65 is provided around the head of the bolt 71 and the edges of the support plate 70. Potting compound 46, which as discussed above, is used to seal the upper and lower edges of the filter medium 45 to prevent air from bypassing the filter medium 4$ along the top and bottom plates 50 and 60.

In operation, air with particulate matter therein is delivered to the housing zo by an inlet port 34 as indicated by arrow 81 (FIG. 1). The air enters the inlet chamber 32 and passes through the filter cartridge 40 as indicated by arrows 82 (FIG. 4). More particularly, the air passes through the outer perforated tubular wall 44 and through the filter medium 45. On the outer surface of the filter medium 45 particulate matter of a size larger than the very small pores in the filter medium 45 collects and accumulates. The air flow continues through the filter cartridge, through the inner porous wall 44 into the inner space 42 and out through central opening 51 in the top mounting plate 50. The air then passes through the outlet chamber to an outlet port 35 as indicated by arrow 83 (FIG. 1). As the particulate matter collects on the filter medium 45, a build up of dust and particulate matter reduces the flow rate and increases the pressure differential across the filter medium 55. The flow through the filter cartridge 40 thus decreases. To remove the dust buildup and increase the flow of the dust collector, the filter cartridges 40 are periodically cleaned.

A periodic filter cleaning arrangement generally indicated by the numeral 90 (FIG. 3) is best illustrated in FIGS. 1 and 2. High pressure air is delivered from a source such as an air compressor, to a plenum 91. The plenum 91 is connected to the source by a pipe 91a (FIG. 1), and branch conduits 92 leading from plenum 91 deliver air through a valve 93 to each air delivery pipe 94. Each pipe 94 overlies a pair of filter cartridges and includes an orifice 95 positioned generally central over each filter cartridge 40. More particularly the orifice are centrally positioned over the central opening 51 and the internal passageway 42. The valve 93 is actuated by a solenoid 96 to operate periodically, in a manner well understood in the art.

As illustrated in FIG. 5, a pulse of high pressure air is directed downwardly to the filter cartridges 40. More particularly the solenoid 96 actuates valve 93 to open for a brief period of time. For example, the valve may open for a small fraction of a second up to and including a second or two. High pressure air passes from the plenum 91 to the branch pipe 92 to the nozzle pipe 94 and then downwardly through the orifice 95. The air pulse moves from the orifice 95 downwardly into the filter cartridge as indicated by arrows 97 to create a reverse flow of air through the filter element 41. This reverse flow dislodges the accumulated dust in generally cake form from the outside of the filter and open up the pores in the filter medium 45 for the passage of the air flow. The periodic cleaning system 90 may operate several times a minute or less often depending on situations and circumstances of the operation of the dust collector 10. It should be noted that not all the filter cartridges 40 are cleaned at once. In the preferred arrangement one or several filter cartridges are cleaned at one time while the remaining filter cartridges continue to operate. This provides for a generally uninterrupted flow of clean air through the outlet port 35. The separated filter dust or dust cakes fall to the bottom of the inlet chamber 32 for collection and disposal at a later time, and in this regard, a suitable discharge opening (not shown) may be provided in the housing to facilitate the removal of the dislodged dust.

It should be noted that as particularly illustrated in FIG. 3, the nozzle air delivery pipe 94 is positioned above the dividing wall 30 a distance equal to or greater than the height dimension of the filter cartridges 40 to allow the filter cartridge 40 to be lifted completely out of the opening 31 without interfering with the pipe 94. The filter cartridges 40 therefore may be removed through the door 36 and a new filter cartridge may be replaced therein. It should be apparent that as a result of the top loading arrangement of the cartridges with the spacing of the delivery pipe, each filter cartridge 40 may be easily installed and removed from the dust collector 10.

To secure the dust collector 40 in position during use, a clamping means 100 is provided. The clamping means 100 comprises a pair of studs 101 secured to the dividing wall 30 on each side of each opening 31, and extending upright therefrom. Preferably the studs 101 are spaced from the opening sufficiently to allow the sealing gasket 56, the annular flange 54 and the peripheral lip 55 to be positioned adjacent the opening 31. A cross bar 102, as best illustrated in FIG. 6, comprises a rigid elongate bar with a relatively narrow cross section in the top perspective view to minimize the interference that cross bar 102 may present to the central opening 51. More particularly the cross bar 102 comprises a pair of spaced apart flat bars 102a and 102b disposed such that the widthwise dimension is vertical and the smallest dimension is flush adjacent the top mounting cap 50. The arrangement of the flat bars 102a and 102b presents less interference to the air flow passing through the central opening 51. Knobs 103 received on the upright studs 101 by screw threads, clamp the bar 102 on the top mounting plate 50. In the preferred arrangement the cross bar 102 includes end portions 102c for partially encircling the studs 101 and for engaging the knobs 103. The end portions 102c include open spaces so as to be removed from the studs without completely unscrewing the knobs 103, note FIG. 6. Accordingly, a filter cartridge may be more quickly replaced. Also, only the cross bar 102 is removed from the collector and not the knobs 103 allowing for fewer free pieces during the replacement. This reduces the possibility of misplacing pieces of the collector during maintenance. The knobs 103 may be tightly secured on studs 101 to compress the sealing gasket 56 preferably so that the peripheral lip 55 engages the dividing wall 30.

One feature provided by the peripheral lip 55 is to provide outer lateral support for the gasket $6. More particularly, the pressures exerted by the primary air flow from the inlet port 34 to the outlet port 3$, and also by the reverse pulses from the orifice 95 put substantial strain on the gasket 66. When the pulses from the orifice 95 impinge on the filter cartridge 40 there is a lateral force from the air directed outwardly on the sealing gasket 56. The gasket 56 is preferably made of rubber or other flexible material and has a tendency to react to the outward pressure. By virtue of the placement of the peripheral lip 55 at the outer edge of the gasket 56, lateral support is provided to prevent the outward movement of the gasket 56. Accordingly, the lip 55 prevents a blow out of the gasket 56, which would occur in time after the shock of many pulses in the reverse direction.

In the drawings and specification there has been set forth a preferred embodiment of the invention, and although specific terms are employed, they are used in a generic and descriptive sense only and not for purposes of limitation.

That which is claimed is:

1. An apparatus for separating particulate matter from an air flow comprising:
   a housing having a hollow interior space;
   a dividing wall separating said hollow interior space into a first inlet chamber and a second outlet chamber, said dividing wall including at least one generally circular opening for the air flow to pass through from said inlet chamber to said outlet chamber;
   inlet means communicating with said inlet chamber for directing the air flow into said housing;
   outlet means communicating with said outlet chamber for exhausting the air flow from said housing;
   filter cartridge means comprising a filter element of elongate hollow cylindrical configuration and defining a top end, an opposite bottom end, and an internal passageway extending longitudinally between said top and bottom ends, said filter cartridge means further comprising a bottom plate closing said bottom end of said filter element, and a top mounting plate secured to and overlying said top end of said filter element, said top mounting plate including a central opening aligned with said internal passageway so as to permit passage of air therethrough and further including an annular flange which extends radially beyond the outer periphery of said filter element,
   said filter cartridge means being mounted in said one opening in said dividing wall, with said top mounting plate being disposed on the outlet chamber side of said opening, with said annular flange overlying the periphery of said opening, and with said filter element extending into said inlet chamber,
   sealing means positioned between said annular flange of said top mounting plate and said dividing wall for surrounding said opening and sealing the interface between said top mounting plate and said dividing wall substantially airtight;
   clamping means for releasably retaining said filter cartridge means in said opening of said dividing wall and so as to compress said sealing means between said top mounting plate and said dividing wall; and
   air pulse cleaning means for periodically separating accumulated particulate matter from the surface of said filter element within said inlet chamber and comprising an air delivery pipe positioned in said outlet chamber and including an outlet which is aligned with said one opening in said dividing wall, and means for periodically directing a pulse of pressurized air from said outlet and into said filter cartridge means, and with said pipe being spaced from said one opening in said dividing wall by a distance of at least about the longitudinal dimension of said filter cartridge means, whereby the filter cartridge means is freely and easily removable into said outlet chamber and replaceable without the disassembly of the air pulse cleaning means.

2. The apparatus according to claim 1 wherein said top mounting plate further includes a peripheral lip extending longitudinally from the outer periphery of said annular flange, and with said peripheral lip directly engaging said dividing wall so as to prevent over compression of said sealing means.

3. The apparatus according to claim 1 wherein said filter element comprises coaxial inner and outer perforated tubular walls defining an annular space therebetween and a filter medium positioned in said annular space.

4. The apparatus according to claim 2 wherein said sealing means has an uncompressed thickness in the longitudinal direction which is greater than the longitudinal dimension of said peripheral lip.

5. The apparatus according to claim 1 wherein said housing has a door communicating with said outlet chamber for permitting removably and replacement of the filter cartridge means therethrough.

6. The apparatus according to claim 1 wherein said clamping means comprises cross bar means extending across said top mounting plate and said central opening for clamping said top mounting plate to said dividing wall, and wherein said cross bar means comprises at least one flat bar disposed such that the smallest dimension thereof is flush to said top mounting plate so as to present minimum interference to the air flow through the central opening.

7. The apparatus according to claim 5 wherein said clamping means further comprises a pair of upright studs mounted on said dividing wall adjacent said opening for cooperating with said cross bar means to clamp said top mounting plate to said dividing wall.

8. The apparatus according to claim 1 wherein said dividing all is substantially horizontally disposed within said dust collector and said outlet chamber is above said inlet chamber, and said filter cartridge means has a substantially longitudinal cylindrical shape extending downwardly through said one opening, and said top mounting plate is positioned above said dividing wall so that said filter cartridge means is removable upwardly from said opening and into said outlet chamber.

9. The apparatus according to claim 8 wherein said dividing wall extends horizontally across said housing and said inlet chamber is below said dividing wall and said outlet chamber is above said dividing wall, and wherein said top mounting plate is positioned above said dividing wall such that said filter cartridge means is located essentially entirely below said dividing wall and in said inlet chamber.

10. A filter cartridge adapted for use in a dust collector of the type which separates particulate matter form a gas flow, said cartridge comprising:
   a filter element of hollow cylindrical configuration and comprising coaxial inner and outer perforated tubular walls, with an annular space therebetween, and a sheet of folded filter medium positioned in said annular space, and such that said filter element defines a top end, an opposite bottom end, and an internal passageway extending longitudinally therebetween;
   a bottom end plate overlying said bottom end of said filter element and secured to said inner and outer perforated tubular walls, so as to close said internal passageway and said annular space;

a top mounting plate secured to and overlying said top end of said filter element, said top mounting plate being formed of a unitary piece of material and comprising (a) a flat annular portion defining an inner circular edge and an outer circular edge, with said annular portion being disposed perpendicularly to said internal passageway and overlying said top end of said filter element;

(b) an inner collar extending longitudinally downwardly from said inner circular edge of said annular portion and so as to define a central opening which is aligned with said internal passageway;

(c) an outer collar extending longitudinally downwardly from said outer circular edge of said annular portion;

(d) an annular flange extending radially outwardly from the lower periphery of said outer collar; and (e) a peripheral lip extending longitudinally downwardly from the outer periphery of said annular flange;

said inner and outer perforated tubular walls of said filter element being joined to said inner and outer collars respectively;

an annular sealing gasket disposed on said annular flange and so as to be positioned between said peripheral lip and said outer perforated wall of said filter element, with said sealing gasket having an uncompressed thickness in the longitudinal direction which is greater than the longitudinal dimension of said peripheral lip;

whereby the filter cartridge is adapted to be mounted in a generally circular opening of a dividing wall, with the sealing gasket being pressed into sealing engagement with the portion of the dividing wall surrounding the opening, and with the peripheral lip engaging the dividing wall so as to prevent over compression of said sealing gasket.

* * * * *

UNITED STATES PATENT AND TRADEMARK OFFICE
CERTIFICATE OF CORRECTION

PATENT NO. : 4,955,996
DATED : September 11, 1990
INVENTOR(S) : Robert R. Edwards et al It is certified that error appears in the above-identified patent and that said Letters Patent is hereby corrected as shown below:

Column 4, line 22, "$3" should be -- 53 --
Column 4, line 29, "$4" should be -- 54 --
Column 4, line 37, "5" should be -- 55 --
Column 5, line 13, "4$" should be -- 45 --
Column 5, line 16, "zo" should be -- 20 --
Column 5, line 47, "orifice" should be -- orifices --
Column 6, line 59, "$6" should be -- 56 --
Column 6, line 61, "3$" should be -- 35 --
Column 6, line 63, "66" should be -- 56 --

In the Claims:

Column 8, line 20, "removably" should be -- removal --
Column 8, line 31, "claim 5" should be -- claim 6 --
Column 8, line 37, "all" should be -- wall Signed and Sealed this Twenty-first Day of April, 1992

Attest:

HARRY F. MANBECK, JR.

*Attesting Officer*     *Commissioner of Patents and Trademarks*